(12) United States Patent
Thompson

(10) Patent No.: US 7,802,766 B2
(45) Date of Patent: Sep. 28, 2010

(54) METHODS AND ASSEMBLIES FOR MOUNTING ARTICLES TO WALLS

(75) Inventor: Craig D. Thompson, Inver Grove Heights, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 12/264,523

(22) Filed: Nov. 4, 2008

(65) Prior Publication Data

US 2010/0108835 A1    May 6, 2010

(51) Int. Cl.
*A47B 96/06* (2006.01)

(52) U.S. Cl. ............................. 248/220.1; 248/223.41

(58) Field of Classification Search ............ 248/223.41, 248/225.11, 221.11, 205.3, 205.4
See application file for complete search history.

(56) References Cited

U.S. PATENT DOCUMENTS

| | | | |
|---|---|---|---|
| 4,708,310 A * | 11/1987 | Smith ........................ | 248/220.1 |
| 5,014,860 A | 5/1991 | Emery | |
| 5,242,063 A | 9/1993 | Erickson et al. | |
| 5,289,927 A | 3/1994 | Emery | |
| 5,340,070 A | 8/1994 | Soma | |
| 5,588,370 A | 12/1996 | Longley | |
| 5,855,073 A | 1/1999 | Boelling | |
| 5,947,322 A | 9/1999 | Ho | |
| 6,162,534 A | 12/2000 | Hamerski | |
| D449,478 S * | 10/2001 | Snell ........................... | D6/566 |
| 6,431,386 B1 | 8/2002 | Hofman et al. | |
| D513,142 S | 12/2005 | Suero, Jr. | |
| D554,416 S * | 11/2007 | Thompson et al. ........... | D6/562 |
| D554,419 S | 11/2007 | Thompson et al. | |
| D563,138 S | 3/2008 | Kramer | |
| 7,540,456 B2 * | 6/2009 | Thompson ............... | 248/205.3 |
| 2001/0028022 A1 * | 10/2001 | Hamerski et al. ........ | 248/205.3 |
| 2005/0040124 A1 | 2/2005 | Fontana et al. | |

OTHER PUBLICATIONS

3M Command Corner Caddy (3M part No. 17617B) first sold in U.S. in Aug. 2008.
Instruction Sheet for 3M Command Corner Caddy (part No. 17617B) first sold in U.S. in Aug. 2008 (1 page).

* cited by examiner

*Primary Examiner*—J. Allen Shriver, II
*Assistant Examiner*—Erin Smith
(74) *Attorney, Agent, or Firm*—Kenneth B. Wood

(57) ABSTRACT

Herein are disclosed methods and assemblies for adhesively mounting an article to two walls that meet at an angle (e.g., a corner). The methods and assemblies use first and second mounting plates that are deflectably and removably attachable to the article, with the first mounting plate being adhesively attachable to a first wall (e.g., by a piece of double-faced adhesive), and the second mounting plate being adhesively attachable to the second wall.

8 Claims, 6 Drawing Sheets

METHODS AND ASSEMBLIES FOR MOUNTING ARTICLES TO WALLS

BACKGROUND

Adhesives (e.g., pressure-sensitive adhesives) have often found use in attaching articles to surfaces. For example, double-faced adhesive tapes (i.e., tapes bearing adhesive on both major opposing surfaces) are widely known and used. In particular, stretch-releasing adhesive tapes have found use in a wide variety of assembling, joining, attaching, and mounting applications.

SUMMARY

Herein are disclosed methods and assemblies for adhesively mounting (i.e., attaching) an article to two walls that meet at an angle (e.g., a corner). In the absence of the methods and assemblies disclosed herein, it may be difficult to adhesively attach an article to two such walls. That is, successful adhesive attachment of an article to corner walls typically necessitates a user to maneuver the article such that one adhesive surface of the article (e.g., a double-faced adhesive strip bonded to the article) is aligned as desired relative to the first wall, and another adhesive surface is aligned as desired relative to the second wall, without either adhesive surface prematurely contacting a wall so as to bond in the wrong location. The user is typically further required to bring both adhesive surfaces into contact with the desired bonding locations of the respective walls nearly simultaneously, while maintaining the above-described alignment. The methods and assemblies disclosed herein overcome these difficulties.

The methods and assemblies disclosed herein provide a straightforward method by which an article can be positioned as desired relative to two walls and adhesively attached to both walls. The disclosures herein rely at least in part on the use of first and second mounting plates that are deflectably and removably attachable to the article, with the first mounting plate being adhesively attachable to a first wall (e.g., by a piece of double-faced adhesive), and the second mounting plate being adhesively attachable to the second wall.

Because the mounting plates are attached to the article in a removable manner, the first mounting plate can be positioned and aligned relative to a first wall and adhesively bonded to the desired location on that wall, without exposed adhesive being present on the second mounting plate during this operation (thus without fear of the second mounting plate of the article prematurely adhering to the second wall in an undesired location); then, the article can be detached from the first mounting plate (which remains adhesively attached to the first wall) so that exposed adhesive can be provided on the second mounting plate. Because the mounting plates are attached to the article in a deflectable manner, the article can then be reattached to the first mounting plate on the first wall while the article is deflected away from the second wall (so that the exposed adhesive on the second mounting plate does not prematurely contact the second wall). Once the article is reattached to the first mounting plate, the article can then be deflected toward the second wall so as to adhesively bond the second mounting plate to the desired location on the second wall.

Thus, in one aspect, herein is disclosed a method of mounting an article to first and second walls that meet at an angle, comprising: placing an article in proximity to first and second walls, the article comprising first and second mounting plates that are deflectably and removably attached to the article and comprising an exposed adhesive surface on the first mounting plate; positioning the article so that the second mounting plate is adjacent the second wall; moving the article toward the first wall so that the exposed adhesive surface of the first mounting plate contacts the first wall and bonds thereto; detaching the article from the first mounting plate; exposing an adhesive surface on the second mounting plate; attaching the article to the first mounting plate with the article deflected so that the exposed adhesive surface on the second mounting plate does not contact the second wall; and, deflecting the article so that the exposed adhesive surface of the second mounting plate contacts the second wall and bonds thereto.

Thus, in another aspect, herein is disclosed an article mountable to first and second walls that meet at an angle, comprising: first and second mounting plates deflectably and removably attached to the article and positioned generally at a right angle to each other, each mounting plate comprising a surface adapted to receive a double-faced adhesive.

Thus, in still another aspect, herein is disclosed a kit for mounting an article to first and second walls that meet at an angle, comprising: at least first and second double-faced adhesives; first and second mounting plates each comprising a major surface that is adapted to receive a double-faced adhesive; and, an article comprising first and second coupling plates attached to the article and positioned generally at an angle to each other; wherein first and second mounting plates are deflectably and removably attachable to first and second coupling plates, respectively.

These and other aspects of the invention will be apparent from the detailed description below. In no event, however, should the above summaries be construed as limitations on the claimed subject matter, which subject matter is defined solely by the attached claims, as may be amended during prosecution.

Like reference symbols in the various figures indicate like elements. Unless otherwise indicated, all figures and drawings in this document are not to scale and are chosen for the purpose of illustrating different embodiments of the invention. In particular the dimensions of the various components are depicted in illustrative terms only, and no relationship between the dimensions of the various components should be inferred from the drawings, unless so indicated. Although terms such as "top", bottom", "upper", lower", "under", "over", "front", "back", "outward", "inward", "up" and "down", and "first" and "second" may be used in this disclosure, it should be understood that those terms are used in their relative sense only unless otherwise noted. In particular, in some embodiments certain components may be present in interchangeable and/or identical multiples (e.g., pairs). For these components, the designation of "first" and "second" may apply to the order of use, as noted herein (with it being irrelevant as to which one of the components is selected to be used first).

DETAILED DESCRIPTION

Figure 1:
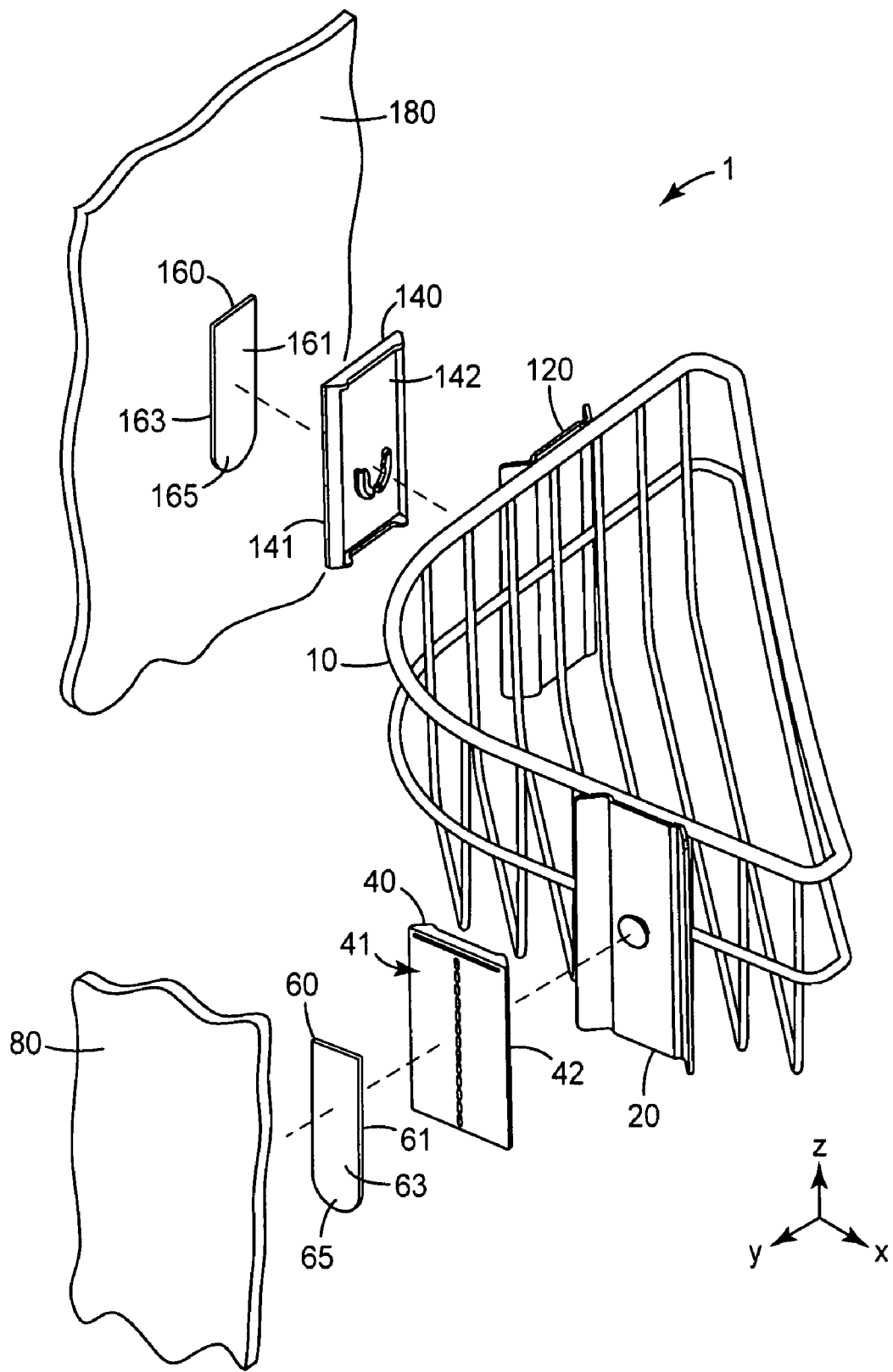
FIG. 1 is a perspective, partially exploded view of an exemplary article comprising a main body, mounting plates, and double-faced adhesives.

Shown in FIG. 1 is a side perspective view of an exemplary assembly that comprises at least article 1, first and second mounting plates 40 and 140, and first and second double-faced adhesives 60 and 160 (with first mounting plate 40 and first double-faced adhesive 60, and second mounting plate 140 and second double-faced adhesive 160, shown in exploded view). First mounting plate 40 and second mounting plate 140 are attachable to article 1 in a removable and deflectable manner, as explained in detail later herein.

Article 1 typically comprises a main body 10, which may be generally triangular in shape so as to fit conveniently into a corner. Main body 10 can be made of any desired material or combination of materials. For example, main body 10 may comprise a wire-rod structure (e.g., a wire basket), as in the exemplary illustration of FIG. 1. Or, main body 10 may comprise a generally solid structure (e.g., a shelf structure), which may have one or more perforations (e.g., for drainage, in the event that article 1 is used as, e.g., a shower caddy). Main body 10 may also have one or more side walls to help hold items in place. Main body 10 may be designed to have two edge portions that are oriented at an angle (e.g. a right angle, so as to conveniently fit into a corner). One such design, suitable for mounting in an "inside" corner, is illustrated in an exemplary manner in FIG. 1. However, main body 10 may encompass any conceivable shape and construction, as long as it may be attached to two walls (e.g., that meet at an angle) as described herein. For example, main body 10 may comprise a generic fixture to which various accessories may be attached. Or, main body 10 may be designed so as to be mountable to an "outside" corner.

Also provided are first and second mounting plates 40 and 140 that are removably and deflectably attachable to main body 10 as described later herein, and first and second double-faced adhesives 60 and 160 that are used to attach first and second mounting plates 40 and 140 to first and second walls 80 and 180 as described herein. In various embodiments mounting plates 40 and 140 may be interchangeable and/or identical. In such a case, the designation of first mounting plate 40 and second mounting plate 140 may only correspond to (i.e., be differentiated by) their order of use. Thus, while the descriptions of specific features of mounting plates herein are mainly phrased in terms of first mounting plate 40, it should be understood that in such embodiments, such description may also apply to second mounting plate 140.

Also provided are double-faced adhesives (i.e., pieces of double-faced adhesive) 60 and 160. In like manner to mounting plates 40/140, in various embodiments double-faced adhesives 60 and 160 may be interchangeable and/or identical except for their order of use. Thus, while the descriptions of specific features of double-faced adhesives herein are mainly phrased in terms of first double-faced adhesive 60, it should be understood that in such embodiments, such description may also apply to second double-faced adhesive 160.

Double-faced adhesive 60/(160) can comprise any suitable sheet, film, layer, etc. that comprises pressure-sensitive adhesive functionality on oppositely-facing major surfaces. Double-faced adhesive 60 can be configured such that first major adhesive surface 61 can be exposed for bonding to bonding surface 41 of mounting plate 40, and such that second major adhesive surface 63 can be exposed for bonding to wall 80.

Double-faced adhesive 60 may be supplied to a user already bonded to bonding surface 41 of mounting plate 40; or, double-faced adhesive 60 may be supplied separately to be bonded to mounting plate 40 by the user. The double-faced adhesive can comprise any suitable adhesive that is available in the form of a sheet, tape, roll good, etc., from which a discrete piece of adhesive 60 can be obtained that is suitable for being contacted with and bonded to bonding surface 41. Suitable adhesives thus include double-stick tapes, laminating adhesives, double-faced foam tapes, and the like, as are commonly known in the art.

In a particular embodiment, the double-faced adhesive comprises a stretch-release adhesive. Such a stretch-release property can allow the adhesive to be securely attached to a surface and to be later removed from the surface without visual disfigurement of, or leaving adhesive residue on, the surface.

A suitable stretch-releasing adhesive can comprise an elastic backing, or a highly extensible and substantially inelastic backing, with a pressure-sensitive adhesive disposed (e.g. coated) thereupon. Or the stretch-releasing adhesive can be formed of a solid, elastic pressure sensitive adhesive. Thus, in this context, the term stretch-releasing adhesive encompasses products that comprise a unitary, integral, or solid construction of adhesive (in addition to products that comprise a backing with separate layers of adhesive residing thereupon). Suitable exemplary stretch-releasing adhesives are described in U.S. Pat. No. 4,024,312 to Korpman; German Patent No. 33 31 016; U.S. Pat. No. 5,516,581 to Kreckel et al.; and PCT International Publication No. WO 95/06691 to Bries et al. Such stretch-release adhesives can range, for example, from about 0.2 mm in thickness to about 2 mm in thickness. If article 1 is to be mounted in a moist environment (e.g., if article 1 is a shower caddy), the composition of the stretch-releasing adhesive can be chosen so as to maintain appropriate adhesion in the presence of moisture.

If double-faced adhesive piece 60 is a stretch-release adhesive, it may comprise a pull tab 65 portion (e.g., an end of piece 60 that does not comprise adhesive), which may be grasped by a user and pulled so as to activate the stretch-release properties of the adhesive when it is desired to detach article 1 from wall 80.

A single piece 60 of double-faced adhesive can be attached to bonding surface 41 of mounting plate 40; or, multiple pieces can be used. For example, if bonding surface 41 is approximately 1⅝ inches wide, two pieces of double-faced adhesive, each approximately ¾ inch wide, can be bonded side by side on bonding surface 41. If two (or more) pieces are used, the pieces may be bonded so as not to be in contact with each other.

According to the assemblies and methods disclosed herein, mounting plate 40 and main body 10 of article 1 are attachable to each other in a deflectable and removable manner. In this context, removably attachable means that main body 10 and mounting plate 40 can be attached to each other, can be separated from each other, and can be reattached to each other (e.g., multiple times). In this context, deflectably attachable means that main body 10 and mounting plate 40, when attached (e.g., connected) to each other, can be deflected (e.g., moved) relative to each other at least a small amount, without becoming detached from each other. In other words, with main body 10 deflectably attached to mounting plate 40 and mounting plate 40 attached to wall 80, it is possible to move at least a portion of main body 10 at least a small amount, relative to mounting plate 40 (hence to wall 80), while maintaining the attachment between mounting plate 40 and main body 10.

In further detail, the assemblies disclosed herein may be designed so that the movement of which main body 10 is capable relative to mounting plate 40 comprises at least partial rotation of main body 10 with respect to a vertical axis coincident with the point of deflectable attachment of main body 10 to mounting plate 40. In this context, the term vertical signifies an axis that is generally parallel to the two walls being bonded (e.g., the axis designated "z", that is parallel to walls 80 and 180 in FIG. 1). In a particular embodiment, the connection between main body 10 and mounting plate 40 is configured such that main body 10 is capable of at least partial rotation with respect to any axis (e.g., either the x, y, or z axis of FIG. 1) that is coincident with the point of attachment of main body 10 to mounting plate 40.

It will be appreciated that with main body 10 and mounting plate 40 deflectably attached to each other as disclosed herein, a small movement of main body 10 proximal to its point of deflectable attachment to mounting plate 40, can correspond to a larger movement of a portion of main body 10 that is distal to its point of deflectable attachment to mounting plate 40. Accordingly, it may not be necessary to allow excessive freedom of motion; that is, the connection between main body 10 and mounting plate 40 can be such that the freedom of motion is limited to that needed to allow such operations as disclosed herein.

In one embodiment, first and second mounting plates 40 and 140 are deflectably and removably attachable to main body 10 of article 1 by the use of coupling plates 20 and 120. (In like manner to mounting plates 40/140 and double-faced adhesives 60/160, in various embodiments coupling plates 20 and 120 may be interchangeable and/or identical except for their order of use. Thus, while the descriptions of specific features of mounting plates herein are mainly phrased in terms of first mounting plate 40, it should be understood that in such embodiments, such description may also apply to second mounting plate 140.)

Figure 2:
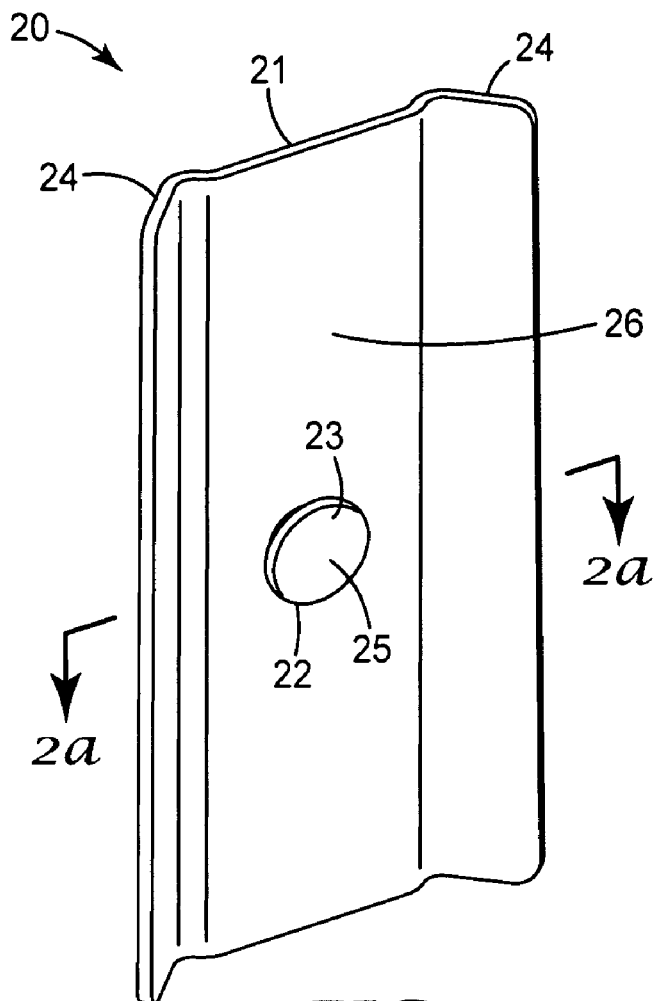
FIG. 2 is a side perspective view of an exemplary coupling plate.
Figure 2A:
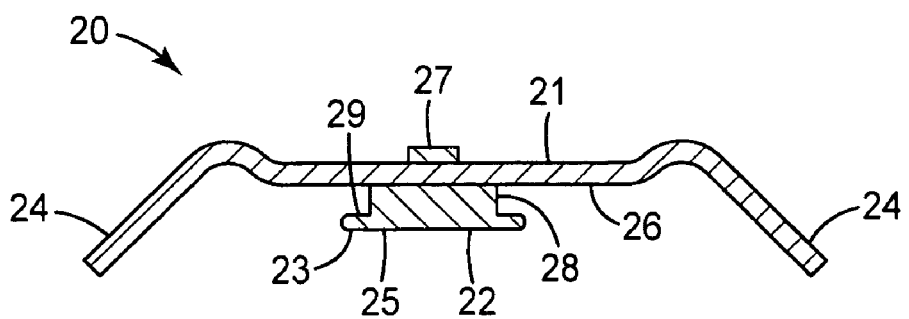
FIG. 2a is a cross sectional view of the exemplary coupling plate of FIG. 2, taken along the designated line in FIG. 2.

Coupling plates 20 and 120 are provided on main body 10 of article 1, and are positioned at an angle (e.g., a right angle) to each other, as in the exemplary illustration of FIG. 1. An exemplary coupling plate 20 is shown in FIGS. 2 and 2A. Coupling plate 20 may be attached (e.g., permanently attached) to main body 10 by attachment means 27 (shown in generic representation in FIG. 2A), which may comprise any suitable mechanical or adhesive attachment means such as a weld, solder, braze, clamp, liquid adhesive, photocurable adhesive, and the like. Or, coupling plate 20 may be integrally formed as part of main body 10 (e.g., if main body 10 and coupling plate 20 are injection molded as one unit). In one embodiment, attachment means 27 is configured such that main body 10 and coupling plate 20 are non-deflectably (e.g., rigidly) attached to each other. In an alternative embodiment, main body 10 and coupling plate 20 are deflectably attached to each other. Such deflectable attachment of coupling plate 20 to main body 10 may further enhance the deflectability of the attachment of main body 10 to mounting plate 40, if this is desired.

In the illustrated exemplary embodiment of FIGS. 2 and 2a, coupling plate 20 comprises main central body 21 with a generally flat first surface 26. In the illustrated embodiment, coupling plate 20 further comprises stud fastener 22 that protrudes generally perpendicularly outward from first surface 26 and comprises stem 28 with relatively smaller diameter, and flange 23 with relatively larger diameter. Flange 23 comprises first surface 25 that faces generally away from first surface 26 of coupling plate 20, and second surface 29 that faces generally toward first surface 26 of coupling plate 20. Flange 23 thus establishes a predetermined space (gap) between first surface 26 of coupling plate 20 and adjacent, generally oppositely-facing surface 29 of flange 23 of stud fastener 22.

Coupling plate 20 is designed to mate with (and specifically to be attachable to in a deflectable, removable, and reattachable manner) mounting plate 40, as discussed later herein in detail.

Figure 3:
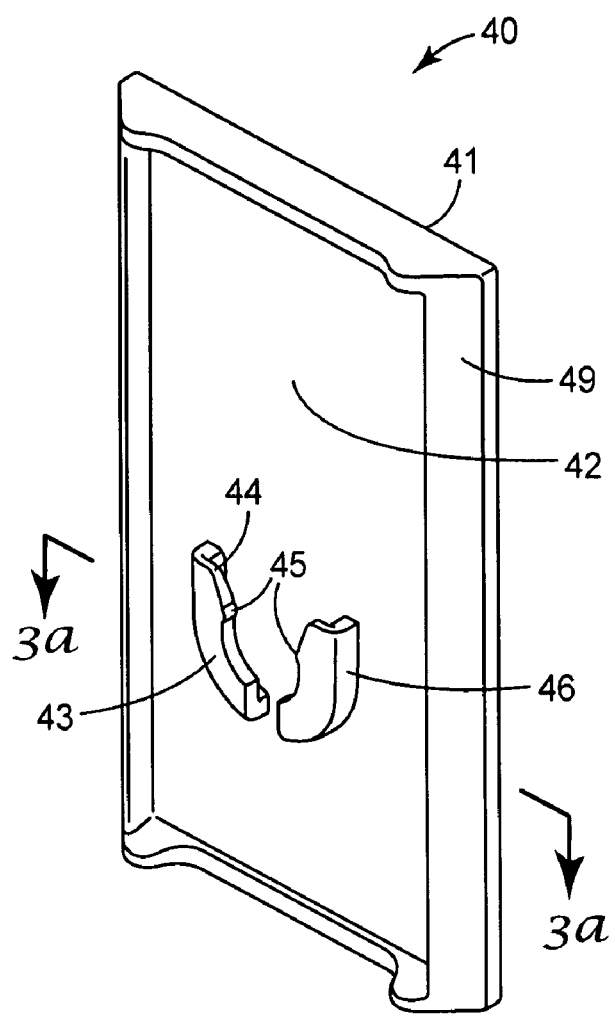
FIG. 3 is a side perspective view of an exemplary mounting plate.
Figure 3A:
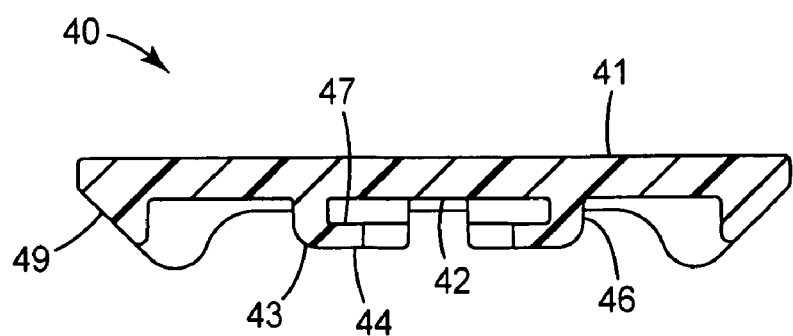
FIG. 3a is a cross sectional view of the exemplary mounting plate of FIG. 3, taken along the designated line in FIG. 3.

In the illustrated exemplary embodiment of FIGS. 3 and 3a, mounting plate 40 comprises a main body with first, generally flat, bonding surface 41, that is configured to receive and be bonded by adhesive surface 61 of double-faced adhesive 60 (not shown in FIG. 3 or 3a). Mounting plate 40 further comprises second major, oppositely-facing, surface 42. Protruding from surface 42 is open-ended saddle fastener 43 that is configured to mate with stud fastener 22 of coupling plate 20. Mounting plate 40 and saddle fastener 43 can be made of any suitable material. In a particular embodiment, mounting plate 40 comprises an injection molded plastic material with saddle fastener 43 integrally molded therewith. In one embodiment, saddle fastener 43 comprises a generally arcuate or semicircular lower portion (which is shown in the embodiment of FIG. 3 as interrupted by a gap at the lowermost portion, but does not have to be), and further comprises an open upper end. Saddle fastener 43 thus provides an open-ended cavity that can receive at least a portion of stud fastener 22 of FIG. 2.

In this exemplary embodiment, saddle fastener 43 comprises perpendicular portion 46 that protrudes from surface 42 of mounting plate 40 in a direction generally perpendicular to surface 42. Flange 44 extends from the terminal end of perpendicular portion 46 and is oriented generally parallel to surface 42. The terminal end of flange 44 forms an open-ended partial collar. Thus, saddle fastener 43 provides a partially enclosed space between surface 42 of mounting plate 40 and inner-facing surface 47 of flange 44, that is designed to receive flange 23 of stud fastener 22.

Flange 44 of saddle fastener 43 further comprises shoulder portions 45 that protrude slightly closer to each other than do adjacent portions of flange 44, and that define a distance therebetween that is designed to be very similar to (e.g., slightly smaller than) the diameter of the above-described stem 28 of stud fastener 22. This arrangement provides that stem 28 can be passed between shoulders 45 with the application of a moderate force (such as can be applied by hand), such that flange 23 of stud fastener 22 is placed and retained in the lower, partially enclosed portion of saddle fastener 43. In this manner stud fastener 22 of coupling plate 20 can be snap-fitted into attachment with saddle fastener 43 of mounting plate 40, and can likewise be removed from saddle fastener 43 by similar application of moderate force so as to pass stem 28 of stud fastener 22 back past shoulders 45 of saddle fastener 43.

Thus in this manner, mounting plate 40 and coupling plate 20 can be attached, removed, and/or reattached to each other. Thus, for example, if mounting plate 40 is attached to a wall (by way of double-faced adhesive attached to bonding surface 41) and coupling plate 20 is attached to mounting plate 40, in an orientation similar to that depicted in FIG. 1, main body 10 of article 1 with coupling plate 20 attached can be moved upward (i.e., along the "z" axis of FIG. 1) so that stud fastener 22 is released from saddle fastener 43, thereby detaching main body 10 from mounting plate 40 and leaving mounting plate 40 attached to wall 80. Likewise, to attach or reattach main body 10 to mounting plate 40, main body 10 can be moved toward mounting plate 40 such that stud fastener 22 of coupling plate 20 is positioned over the open end of saddle fastener 43, and main body 10 then moved downward so as to pass stem 28 of stud fastener 22 through shoulders 45 of saddle fastener 43 so as to attach stud fastener 22 to saddle fastener 43.

Coupling plate 20 and mounting plate 40 are also attachable to each other in a deflectable manner. Thus, in addition to the above-described features that impart removability, stud fastener 22 and saddle fastener 43 are designed to allow the desired deflectability. Specifically, (with reference to FIGS. 2/2a and 3/3a) the thickness (between first and second surfaces 25 and 29) of flange 23 of stud fastener 22 is chosen so as to be somewhat less than the gap between surface 42 of mounting plate 40 and oppositely-facing surface 47 of saddle fastener 43 of mounting plate 40. Such clearance allows stud fastener 22 at least some freedom of movement relative to saddle fastener 43, while still being retained by saddle fastener 43. Similarly, the diameter of stem 28 of stud fastener 22 is chosen such that the terminal end of flange 44 of the lower portion of saddle fastener 43 does not tightly impinge stem 28. That is, flange 44 of saddle fastener 43 is designed such that once stem 28 of stud fastener 22 is passed through the narrow "neck" portion of saddle fastener 43 established by shoulders 45, stud fastener 22 is held by saddle fastener 43 in such a manner as to allow at least some freedom of motion of stud fastener 22 relative to saddle fastener 43. This design of stud fastener 22 and saddle fastener 43 can permit at least some limited movement of coupling plate 20 with respect to mounting plate 40.

It should be noted that for purposes of illustration an embodiment has been described herein in which stud fastener 22 and portions thereof are of a generally radial geometry such that parameters thereof have been described in terms of e.g., diameter. However, stud fastener 22, saddle fastener 43, etc., may instead be designed in other basic geometries (square, rectangular, irregular, etc.) while retaining the functions described herein. Accordingly, such other geometries should be understood as falling within the scope of the disclosures herein. Similarly, mounting plate 40 and coupling plate 20 are sometimes described herein with reference to an exemplary design in which coupling plate 20 and/or mounting plate 40 are generally elongate with a long axis and a short axis and a thickness, (e.g., so as to comprise a generally rectangular plate). Again, other configurations are possible and should be understood as being encompassed by the scope of the disclosures herein.

The arrangements described above allow at least some limited movement between mounting plate 40 and coupling plate 20 when attached to each other by way of stud fastener 23 and saddle fastener 43. It should be emphasized that other approaches may be used to achieve the same ends. For example, the above exemplary embodiments utilize a stud fastener (e.g., a male fastener) on coupling plate 20, and a saddle fastener (e.g., a female fastener) on mounting plate 40. Other types of male and/or female fasteners can be used. In addition, a female fastener could be provided on coupling plate 20, with a male fastener provided on mounting plate 40. And, of course, it should be appreciated that it may not be necessary to utilize a coupling plate in order to establish a removable and deflectable attachment between main body 10 and mounting plate 40. For example, a stud fastener similar to the above-described stud fastener 22 could be provided directly on main body 10 for attachment to saddle fastener 43 of mounting plate 40.

Figure 4:
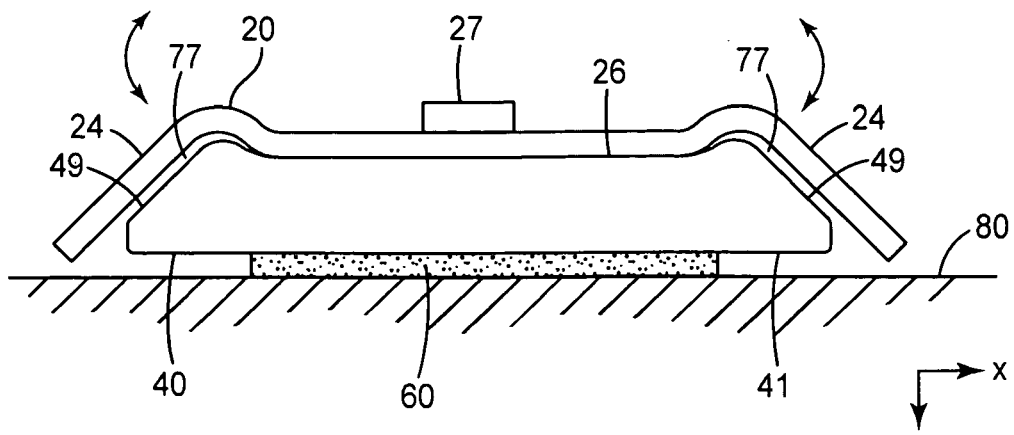
FIG. 4 is a top view of an exemplary mounting plate deflectably and removably attached to an exemplary coupling plate.

It may be desirable to further enhance, and/or control, the freedom of movement allowed between mounting plate 40 and coupling plate 20. Accordingly, additional features of mounting plate 40 and coupling plate 20 may be incorporated. Specifically, it may be advantageous to permit such limited movement of coupling plate 20 (hence main body 10) relative to mounting plate 40 as comprises partial rotation of coupling plate 20/main body 10 around a generally vertical axis of rotation coincident with the point of deflectable attachment of coupling plate 20 to mounting plate 40 (e.g., the centerpoint of stud fastener 22/saddle fastener 43 connection), while minimizing the amount to which certain other movements can occur. Thus (with reference to FIGS. 2/2a and 3/3a), in one embodiment coupling plate 20 comprises angled flanges 24, and mounting plate 40 comprises angled protruding edge surfaces 49, with flanges 24 and edge surfaces 49 being configured so as to be oriented in a generally vertical direction (e.g., as in FIGS. 1-4) when article 1 is mounted to vertical walls. With this design, when mounting plate 40 and coupling plate 20 are attached to each other (e.g., by the above-described procedures) as shown in FIG. 4, angled protruding edge surfaces 49 of mounting plate 40 are adjacent to flanges 24 of coupling plate 20, with a small (e.g., approximately 2 mm or less) gap 77 therebetween. (Each flange 24 may further comprise an arcuate recess (as shown in FIGS. 2/2a and 4), and each protruding edge surface 49 may have a matching protrusion (as shown in FIGS. 3/3a and 4) so as to further define gap 77.) In performance of the methods disclosed later herein, this system of vertically oriented flanges 24 on coupling plate 20 and vertically oriented protruding edge surfaces 49 on mounting plate 40 may permit at least some partial rotation of coupling plate 20/main body 10 around a generally vertical axis of rotation (e.g., axis "z" of FIG. 1) coincident with the point of deflectable attachment of coupling plate 20 to mounting plate 40, while limiting to a desired amount, the rotation that can occur around a horizontal axis (e.g., axis "x" or "y" of FIG. 1).

Thus, in the configuration exemplified in FIG. 4, when mounting plate 40 is attached to wall 80, at least some limited motion of coupling plate 20 relative to mounting plate 40, in the directions marked by the curved arrows in FIG. 4, is permitted. The range of such motion may be limited by interaction (i.e. physical contact) between flanges 24 of coupling plate 20 and protruding edges surfaces 49 of mounting plate 40, and/or by interaction (i.e. physical contact) between stud fastener flange 23 of coupling plate 20 and surfaces 42 and 47 of mounting plate 40 and mounting plate saddle fastener flange 44, respectively. (It may be preferable to design the system such that all of the above-discussed components combine to establish the desired range of motion.)

It should be appreciated that even a small range of motion of the various components of coupling plate 20 with respect to the various components of mounting plate 40 can result in an appreciable range of motion of portions of main body 10 that are distal to mounting plate 40 and coupling plate 20. Only such freedom of motion is needed, of course, as to allow main body 10 to be deflected so as to allow the processes described later herein to be carried out. In various embodiments, the allowed range of rotation of coupling plate 20 with respect to any axis passing through the point of attachment of coupling plate 20 to mounting plate 40 (e.g., the centerpoint of the stud fastener/saddle fastener connection) comprises less than about 30 degrees, less than about 20 degrees, or less than about 10 degrees.

An exemplary method of use of the assemblies disclosed herein is now described with reference to FIGS. 5, 6 and 7. In this illustration, article 1 is provided that comprises generally triangular main body 10 with first and second mounting plates 40/140 attached thereto generally at right angles to each other. First and second mounting plates 40/140 are respectively removably and deflectably attached to first and second coupling plates 20/120 (e.g., by means of first and second stud fasteners 22/122 and first and second saddle fasteners 43/143 as described previously), and double-faced adhesives 60/160 are respectively attached to mounting plates 40/140. (As mentioned, any or all of these operations may be performed prior to the assembly being provided to a user.) In this context, "first" components 20/40/60 signify those that will be attached first, to "first" wall 80, and "second" components 120/140/160 signify those that will be attached second, to second wall 180; the various pairs of components may be interchangeable and/or identical.

Adhesive surface 63 of first adhesive 60 upon bonding surface 41 of first mounting plate 40 is exposed (e.g., by removing release liner 64, not shown in these Figures), while adhesive surface 163 of second adhesive 160 is not exposed (e.g., by virtue of release liner 164 being present atop adhesive surface 163).

Figure 5:
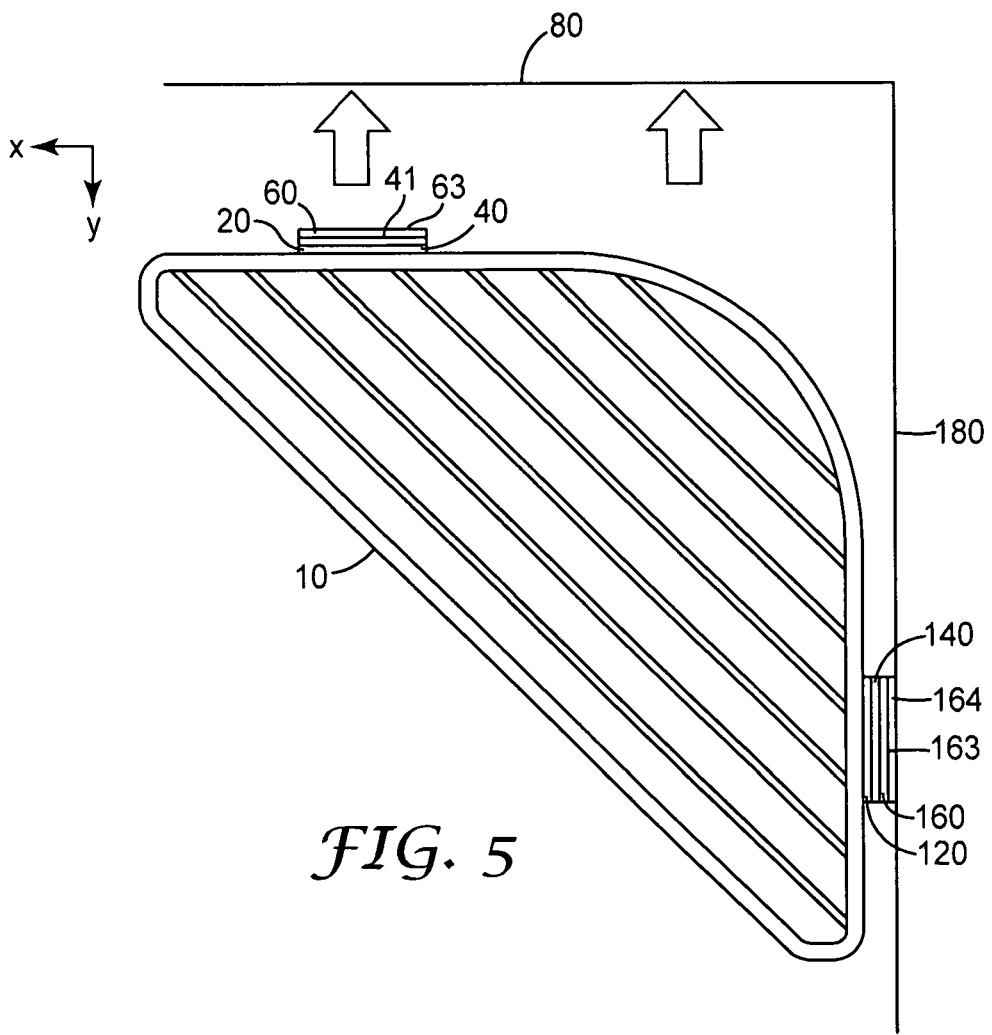
FIG. 5 is top view illustrating an exemplary process of adhesively attaching an article to a first wall by a first mounting plate.
Figure 6:
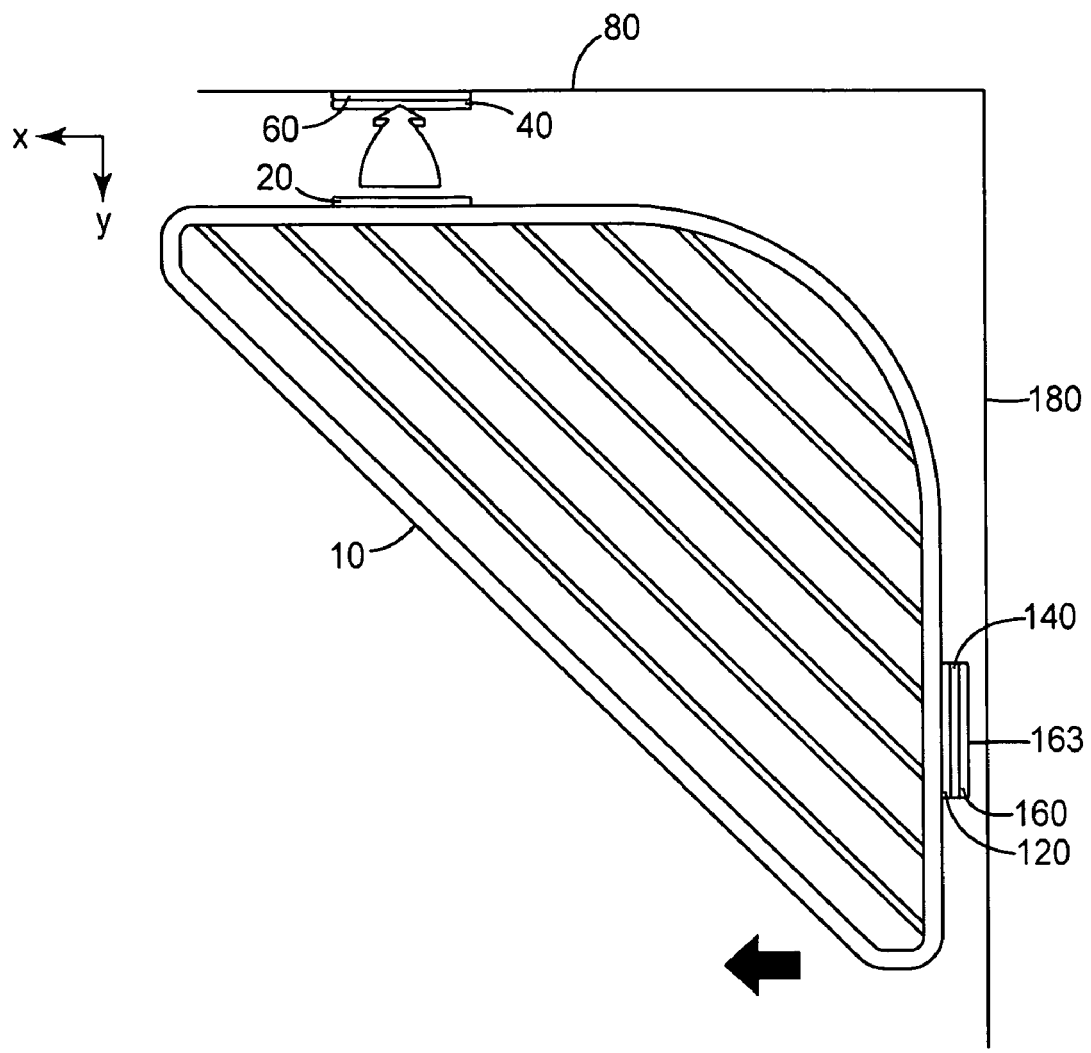
FIG. 6 is a top view illustrating an exemplary process of reattaching an article to a first mounting plate on a first wall, with the main body of the article in a deflected condition.

Main body 10 is positioned as shown in the top view of FIG. 5, with main body 10 placed at the desired vertical location on walls 80/180 (many users may prefer main body 10 to be generally level), with exposed adhesive surface 63 of first double-faced adhesive 60 facing toward first wall 80, and nonexposed adhesive surface 163 of second double-faced adhesive 160 facing toward second wall 180. Main body 10 is positioned such that nonexposed adhesive surface 163 is adjacent to second wall 180 (typically, in such an operation, release liner 164 that is atop adhesive surface 163 will physically contact second wall 180). Main body 10 is then moved toward first wall 80, (e.g., with release liner 164 slidably moving along second wall 180) in the direction denoted by the two arrows in FIG. 5, until exposed adhesive surface 63 of first double-faced adhesive 60 contacts wall 80 and bonds thereto, at a desired location. Main body 10 is then moved upward (e.g., in the "z" direction that is upward out-of-plane in FIG. 5) so that stud fastener 22 of first coupling plate 20 is released from saddle fastener 43 of first mounting plate 40 so that first coupling plate 20 and main body 10 are now detached from first mounting plate 40 (which remains adhesively attached to the desired location on wall 80). Adhesive surface 163 of second double-faced adhesive 160 on second mounting plate 140 is then exposed (e.g., by removing release liner 164 from atop adhesive surface 163). Main body 10 is then positioned as shown in FIG. 6 (with first coupling plate 20 adjacent to first mounting plate 40), with care being taken to position main body 10 such that exposed adhesive surface 163 does not contact second wall 180. First coupling plate 20 is then reattached to first mounting plate 40 by positioning main body 10 such that stud fastener 22 of first coupling plate 20 is above the open end of saddle fastener 43 of first mounting plate 40, then moving main body 10/coupling plate 20/stud fastener 22 downward (as shown by the curved arrow in FIG. 6) so that stud fastener 22 is reattached to saddle fastener 43. During this process, main body 10 is deflected in the direction denoted by the straight arrow in FIG. 6, so that second adhesive surface 163 does not contact second wall 180.

Figure 7:
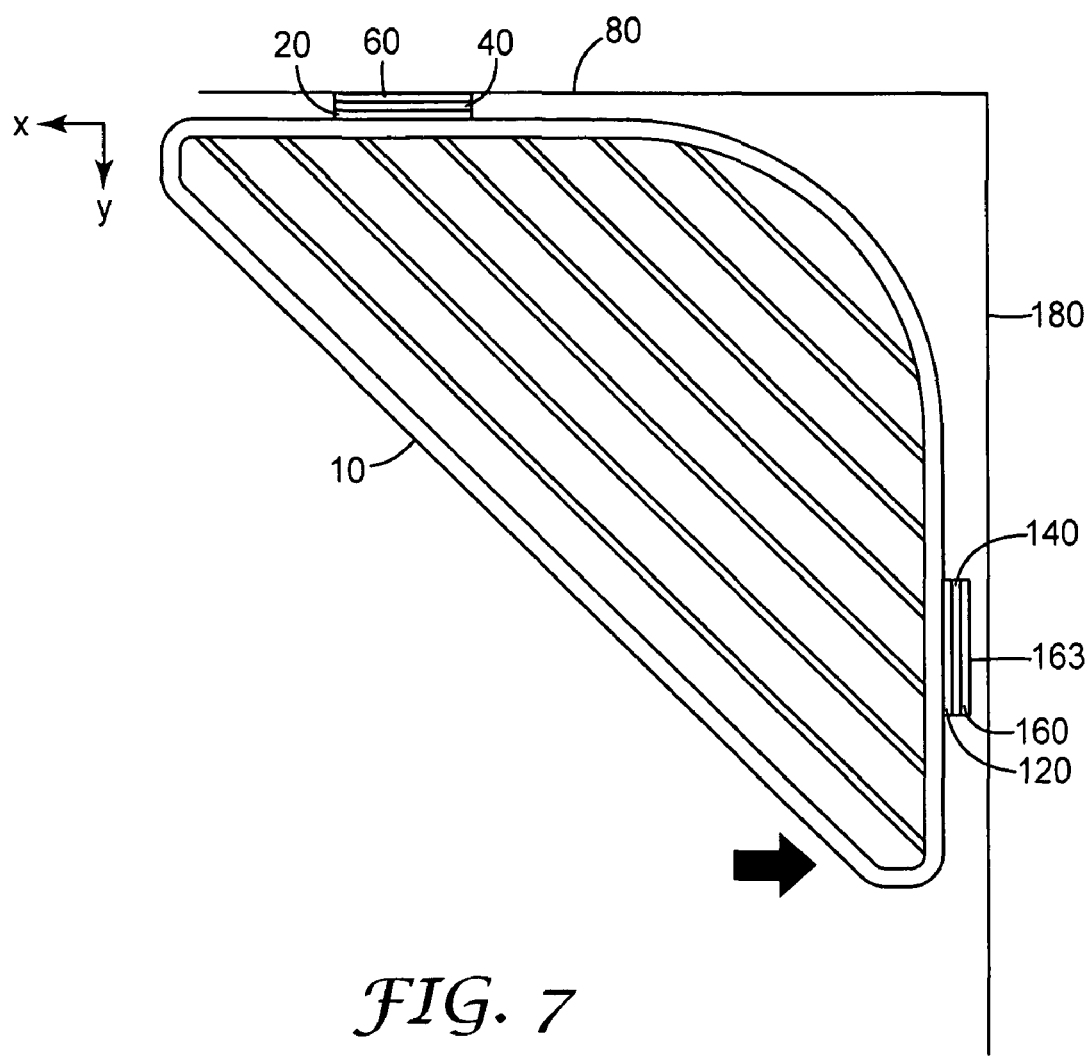
FIG. 7 is a top view illustrating an exemplary process of deflecting the main body of an article toward a second wall so as to adhesively attach the article to the second wall by a second mounting plate.

As illustrated in FIG. 7, after first coupling plate 20 is reattached to first mounting plate 40, main body 10 is deflected toward second wall 180 (in the direction marked by the arrow in FIG. 7) so that second adhesive surface 163 contacts second wall 180 in a desired location and bonds thereto. The end result of these processes is that main body 10 is bonded to first and second walls 80 and 180 by at least one double-faced adhesive in contact with each wall.

Based on the above descriptions, it will be appreciated that the aforementioned deflectable connection between coupling plate 20 and mounting plate 40, serves first to allow main body 10 to be deflected toward second wall 180 such that mounting plate 140 can be placed in close proximity to second wall 180 during the process of attaching first mounting plate 40 to a desired location on first wall 80. This aids in achieving proper placement of the article relative to both walls during the act of attaching first mounting plate 40 to first wall 80. It will further be appreciated that the same deflectable connection later serves to allow main body 10 to be deflected away from second wall 180 such that contact of second adhesive surface 163 with second wall 180 is avoided during the process of reattaching first coupling plate 20 to first mounting plate 40. It will still further be appreciated that the same deflectable connection allows main body 10 to be deflected toward second wall 180 so as to allow second mounting plate 140 to be adhesively attached to second wall 180, after main body 10 has been reattached (via first coupling plate 20) to first mounting plate 40.

As mentioned previously, only such range of motion as is needed to carryout the above-described deflections is needed. Thus, in various embodiments, the allowed rotation of main body 10 with respect to any axis passing through the point of attachment of main body 10 to mounting plate 40 comprises less than about 30 degrees, less than about 20 degrees, or less than about 10 degrees (with respect to a complete, 360 degree rotation of main body 10 around the point of attachment).

Many variations of the above-described assemblies and methods are possible. For example, the various components disclosed herein can be supplied to a user in a variety of configurations. For example, adhesives 60/160 can be preattached to mounting plates 40/140, and/or mounting plates 40/140 can be preattached to coupling plates 20/120, and/or coupling plates 20/120 can be preattached to main body 10. In a convenient format, a kit is provided in which coupling plates 20/120 are preattached (e.g., by spot-welding) to main body 10, and mounting plates 40/140 and adhesives 60/160 are packaged with main body 10, but are not preattached to main body 10 or to each other.

In the above illustrations, both coupling plates (20 and 120) have been described as deflectably attachable (e.g., connectable) to their respective mounting plates. This may not be necessary in all embodiments (for example, in the above embodiment, it may not be necessary that the connection between second mounting plate 140 and second coupling plate 120 be deflectable). However, for ease of use, it may be preferable that both connections are deflectable. For example, such dual deflectability may provide for greater ability to bond to walls that do not meet at exactly right angle, and/or that have local variations or irregularities.

In the above illustrations both coupling plates have been described as removably attachable to their respective mounting plates. This may not be necessary in all embodiments (for example, in the illustrations described with reference to FIGS. 5-7, it may not be necessary that second mounting plate 140 and second coupling plate 120 be removable from each other). However, such dual removability may be advantageous. Specifically, an advantage of such dual removability is that, once the above-described bonding of adhesives 60 and 160 to walls 80 and 180 is accomplished, first and second coupling plates 20/120 may then be detached from first and second mounting plates 40/140. This may allow a user to easily apply direct pressure to each mounting plate to enhance the adhesive bond to the wall, if desired. This may also allow a time period for further development of an enhanced bond between double-faced adhesives 60/160 and walls 80/180 (e.g., as may be desirable with some stretch-release adhesives), with minimum load being present on adhesives 60/160 during this time (since adhesives 60/160 will not be subject to the extra weight of coupling plates 20/120 and/or main body 10 during this time).

It is further noted that the illustrations herein describe the attaching of an article to two walls by way of single mounting plate 40 attached to first wall 80 and single mounting plate 180 attached to second wall 180. If desired (for example, to support greater loads), multiple mounting plates could be attached to one or both walls. Mounting plate 40 (and/or coupling plates 20) can be elongated in one direction so as to comprise a short axis and a long axis (as shown in the Figures herein), so as to be adapted to receive one or more elongated lengths of double-faced adhesive. If desired, mounting plate 40 can be sized such that tab 65 of double-faced adhesive 60 protrudes therefrom for ease of access (e.g., when it is desired to activate stress-releasing properties of adhesive 60). Coupling plate 20 can be designed to be longer than mounting plate 40 along the long axis of each plate, such that coupling plate 20 partially or completely blocks tab 65 of adhesive 60 from view when article 1 is mounted to corner walls, if this is desired.

Other configurations are encompassed within the disclosures herein. For example, the above-described attaching of first mounting plate 40 to first wall 80 was described as being performed with nonexposed adhesive surface 163 being provided on second mounting plate 140 by virtue of release liner 164 being present atop adhesive surface 163 of double-faced adhesive 160 (thus preventing the exposure of adhesive surface 163). In this context, the providing of a "nonexposed adhesive surface" includes a configuration in which the attaching of first mounting plate 40 to first wall 80 is performed with second double-faced adhesive 160 being absent (from second mounting plate 140), with second double-faced adhesive 160 instead being applied to second mounting plate 140 later. However, for enhanced accuracy of placement, it may be preferable to have double-faced adhesive 160 present (e.g., protected by release liner 164) during the attachment of first mounting plate 40 to first wall 80.

Still other features may be usefully employed within the context of the above disclosures. For example, second release liner 164 may be supplied in such a manner that it is not removed from adhesive surface 163 of second double-faced adhesive 160 until after first coupling plate 20 is reattached to first mounting plate 40 (e.g., until after the step illustrated in FIG. 6 is complete). In such an embodiment, release liner 164 may be supplied in a folded configuration (which includes configurations with multiple folds, such as a Z-folded configuration) such that release liner 164 can be easily peeled away from adhesive surface 163 (e.g., even if the space between adhesive surface 163 and second wall 180 is limited).

In other embodiments, one or both coupling plates 20 or 120 can be configured to be deflectable relative to main body 10 of article 1. Such deflectable attachment of coupling plates 20 and/or 120 to main body 10 can be in addition to, or instead of, the deflectable attachment of coupling plates 20 and/or 120 to mounting plates 40 and/or 140. For example, in one embodiment coupling plate 20/120 may comprise a female fastener into which a wire rod member of main body 10, may be snap-fitted such that some rotation of the female fastener, e.g., of coupling plate 20/120, relative to the wire rod and thus to main body 10, may occur. In an alternative embodiment, second coupling plate 120 can be attached to main body 10 in a retractable manner so that it can be retracted (e.g., toward main body 10), so as to avoid contact of second mounting plate 140 with second wall 180 during the attachment of first mounting plate to first wall 80. In a specific embodiment, second coupling plate 120 is hingedly attached to main body 10 so that it can be partially rotated away from second wall 180. In an alternate specific embodiment, second coupling plate 120 can be retractably attached to main body 10 (e.g., by way of being on a leaf spring structure) so that it can be depressed away from second wall 180 during the attachment of first mounting plate to first wall 80. And, it should be appreciated that it may not be necessary to use a coupling plate in order to provide a removable and deflectable attachment between main body 10 and mounting plate 40, as mentioned earlier herein. In still another configuration, main body 10 itself can comprise two hingedly connectable portions such that a second portion, comprising second mounting plate, adhesive, etc., can be deflected so as to avoid contact with a second wall while a first portion is attached to a first wall.

In certain embodiments, it is also possible to use a spacing device (e.g., a disposable device) to assist in proper positioning of the article during the above-described procedures. For example, a spacing device may be attached to a second edge of main body 10 that prevents adhesive surface 163 from contacting second wall 180 until such contact is desired. Such a spacing device may be removable at the desired time; or, it may be deflectable such that application of sufficient pressure causes the device to deflect such that contact of adhesive surface 163 with second wall 180 is permitted.

While the disclosures herein have been mainly discussed with respect to mounting of an article to two "walls" (e.g., that meet so as to form an "inside" corner), other configurations are possible. For example, the methods and assemblies herein may be used to mount an article to two walls that meet to form an "outside" corner. Also, the term "wall" as used herein is not limited to items that are substantially vertical and/or that comprise, e.g., walls of buildings. Thus, the term "wall" as used herein encompasses such items as ceilings, shelves, and the like.

A number of embodiments of the invention have been described. Nevertheless, it will be understood that various modifications may be made without departing from the invention. All such variations and combinations are contemplated by the inventor as being within the bounds of the conceived invention. Accordingly, all such embodiments are within the scope of the following claims.

What is claimed is:

1. A method of mounting an article to first and second walls that meet at an angle, comprising:
   placing an article in proximity to first and second walls, the article comprising first and second mounting plates that are deflectably and removably attached to the article and comprising an exposed adhesive surface on the first mounting plate;
   positioning the article so that the second mounting plate is adjacent the second wall;
   moving the article toward the first wall so that the exposed adhesive surface of the first mounting plate contacts the first wall and bonds thereto;
   detaching the article from the first mounting plate;

exposing an adhesive surface on the second mounting plate;

attaching the article to the first mounting plate with the article deflected so that the exposed adhesive surface on the second mounting plate does not contact the second wall;

and, deflecting the article so that the exposed adhesive surface of the second mounting plate contacts the second wall and bonds thereto.

2. The method of claim 1 wherein the adhesive surface on the first mounting plate and the adhesive surface on the second mounting plate are provided by first and second stretch-releasing double-faced adhesives, respectively.

3. The method of claim 2 wherein the second stretch-releasing double-faced adhesive on the second mounting plate comprises a release liner that prevents exposure of the adhesive surface and wherein the exposing of the adhesive surface on the second mounting plate comprises removal of the release liner from the second stretch-releasing double-faced adhesive.

4. The method of claim 3 wherein the positioning of the article so that the second mounting plate is adjacent the second wall comprises contacting the release liner of the second stretch-releasing double-faced adhesive with the second wall.

5. The method of claim 1 wherein the article comprises first and second coupling plates that are attached to the article and wherein the first and second mounting plates are deflectably and removably attached to the article by way of being deflectably and removably attached to first and second coupling plates, respectively.

6. The method of claim 5 wherein first and second mounting plates comprise first and second saddle fasteners, respectively, and first and second coupling plates comprise first and second stud fasteners, respectively, and wherein first and second mounting plates are attached to first and second coupling plates by way of first and second saddle fasteners being removably and deflectably attached to first and second stud fasteners, respectively.

7. The method of claim 1 further comprising the steps of detaching the article from first and second mounting plates, manually pressing first and second mounting plates against first and second walls, respectively, and reattaching the article to first and second mounting plates.

8. The method of claim 7 further comprising the step of waiting at least one hour before reattaching the article to first and second mounting plates.

* * * * *